United States Patent [19]

Campbell et al.

[11] 4,098,002
[45] Jul. 4, 1978

[54] APPARATUS FOR LOCATING INTER-PUPILARY OF NOSE BRIDGE MOUNTED SPECTACLES TO LENS METER

[75] Inventors: Charles E. Campbell, Berkeley; William E. Humphrey, Orinda, both of Calif.

[73] Assignee: Humphrey Instruments Incorporated, San Leandro, Calif.

[21] Appl. No.: 805,957

[22] Filed: Jun. 13, 1977

[51] Int. Cl.$^2$ .............................................. A61B 3/10
[52] U.S. Cl. .................. 33/200; 33/174 A; 356/127
[58] Field of Search ............... 356/127; 33/174 A, 200

[56] References Cited

U.S. PATENT DOCUMENTS

| 397,744 | 2/1889 | Meylowitz | 33/200 |
| 1,383,678 | 7/1921 | Tillyer | 356/127 |
| 2,481,716 | 9/1949 | Black | 356/127 |

Primary Examiner—Charles E. Phillips
Attorney, Agent, or Firm—Townsend and Townsend

[57] ABSTRACT

In combination with a lens meter for measuring along a single optical path the power of suspect optics, an apparatus for positioning nose bridge mounted spectacles is disclosed. At least one nose locator piece simulating the shape and location of the human nose is mounted for sliding movement on a bar. A bar locks vertical lens movement on the base of the lens frame at the bottom of the lenses to establish the elevation of the visual center on each lens for each eye. The transverse spacing of the nose locator piece locates the remaining coordinate of the visual center of the suspect lens. The nose locator piece, when registered to the spectacles at the nose bridge, is read through an attached and typically magnified scale to indicate nose bridge to visual center distance. By using paired nose locator pieces and paired scales, rapid measurement of nose frame mounted spectacles can occur at the spaced visual centers for the right and left eye lens to a lens meter having a monocular light path. The bar locking vertical lens movement preferably includes a pressure sensitive portion to indicate a positioned lens for measurement as well as to provide identification (left or right suspect lens) of the particular nose bridge mounted suspect lens being measured.

13 Claims, 3 Drawing Figures

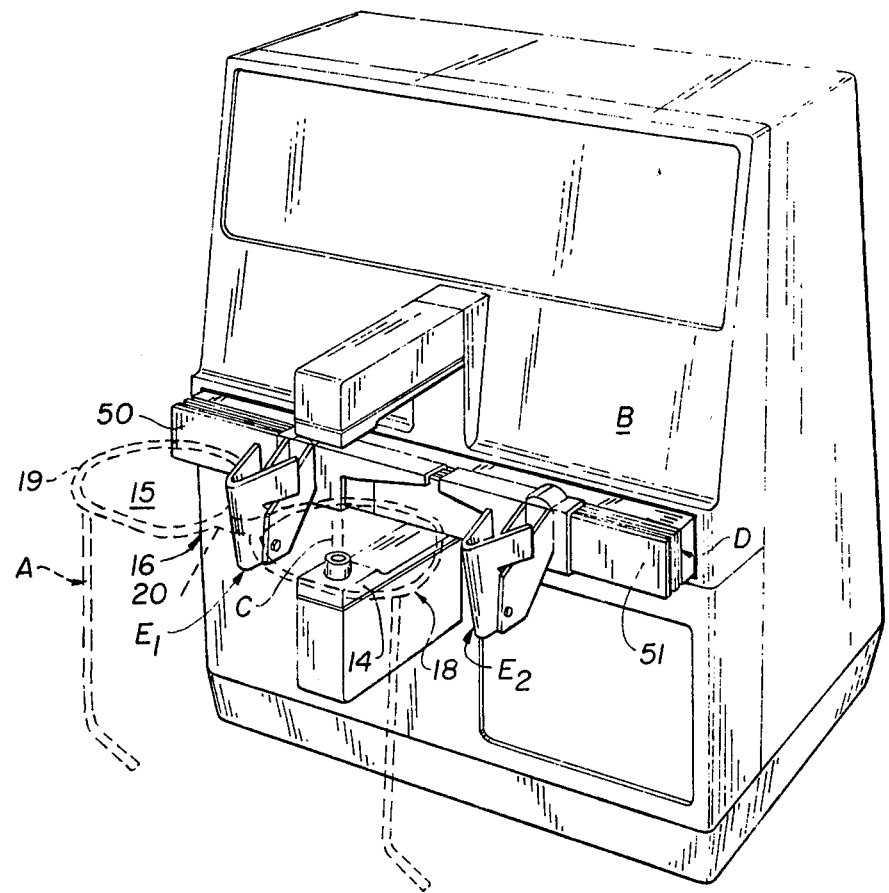
FIG._1.
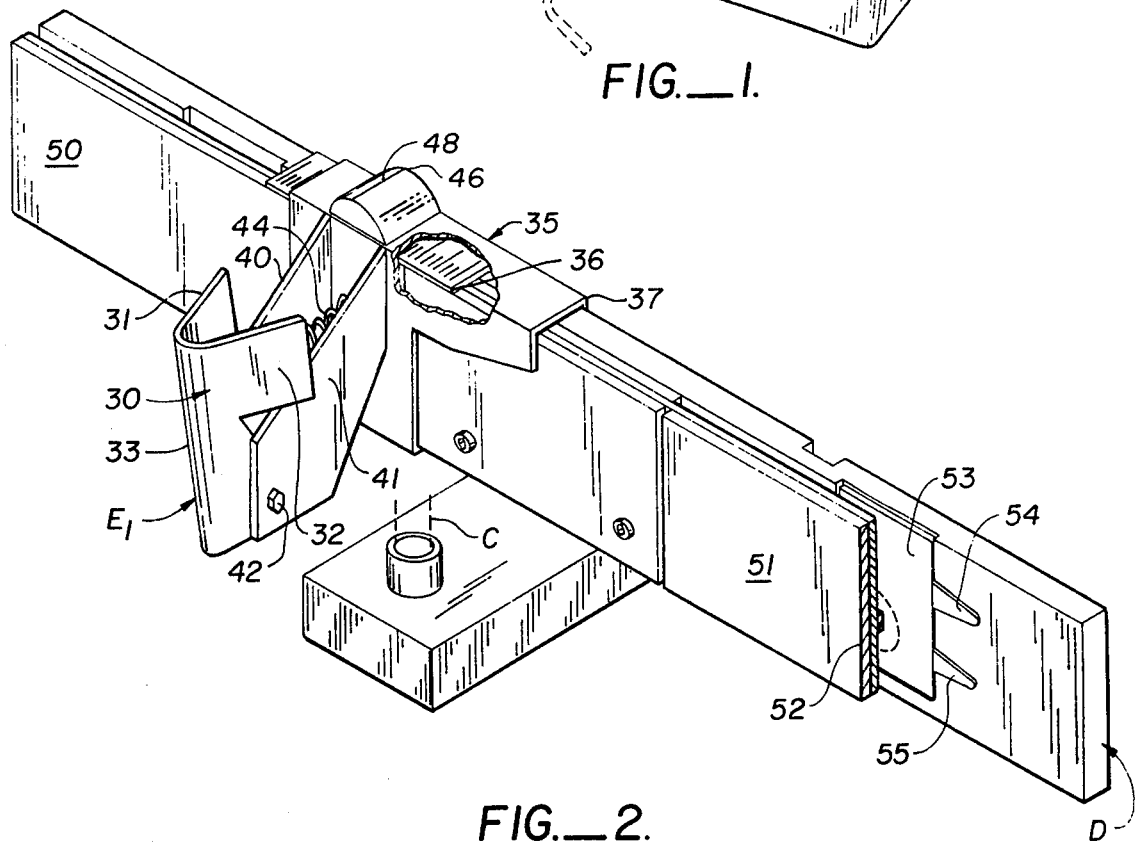
FIG._2.

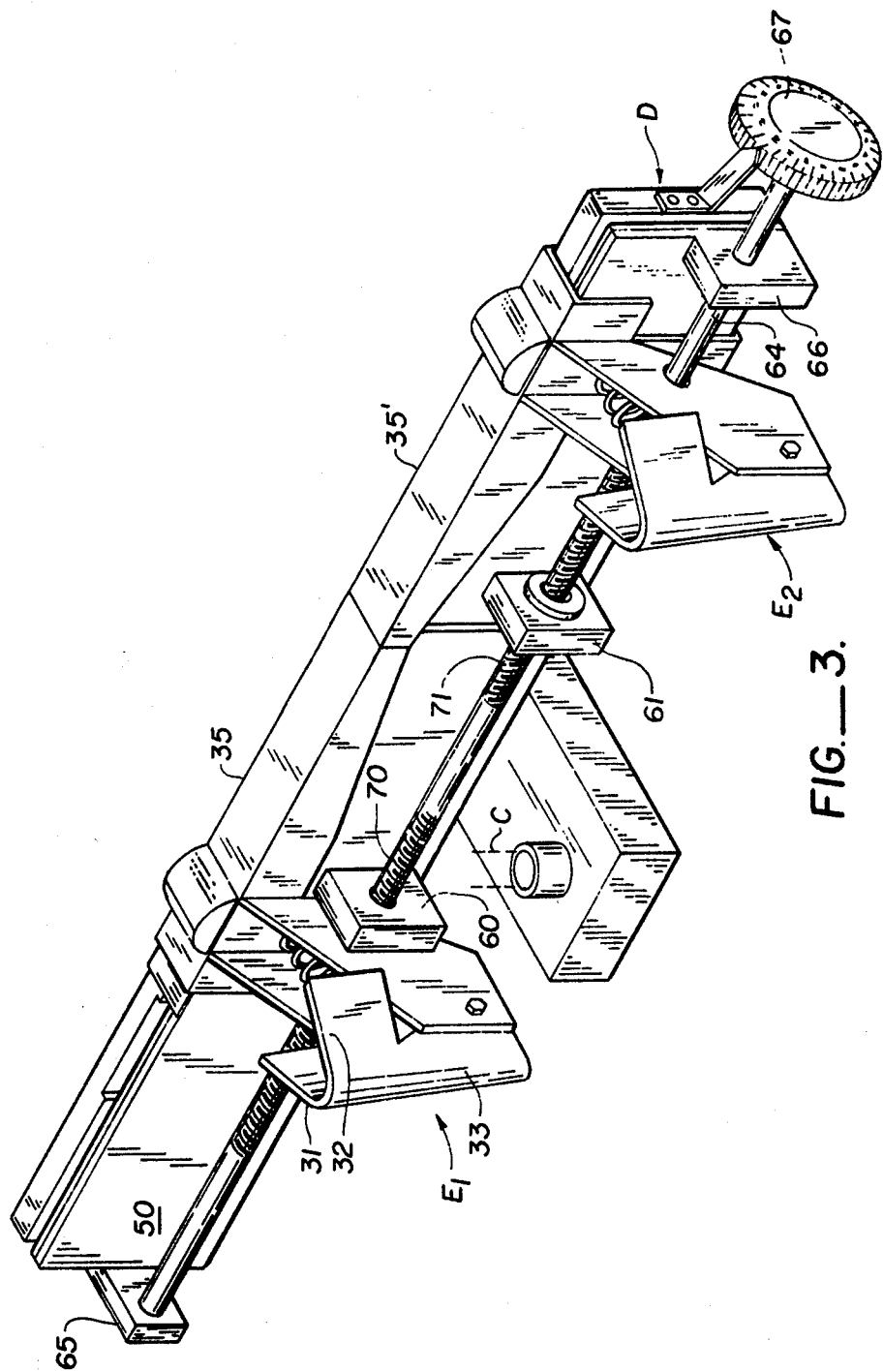
FIG._3.

APPARATUS FOR LOCATING INTER-PUPILARY OF NOSE BRIDGE MOUNTED SPECTACLES TO LENS METER

This invention relates to lens meters and particularly to a device for use with lens meters to readily locate the interpupilary distance with respect to nose bridge mounted corrective optics.

SUMMARY OF THE PRIOR ART

One of the most critical measurements used in the prescription of spectacles is the prescribed inter-pupilary distance. Where strong optic prescriptions are present, towards and away spacing of each spectacle lens from the remaining spectacle introduces prism. Small error can result in patient diplopia (double images) resulting in startling patient discomfort.

In such a critical inter-pupilary distance measurement, each spectacle has a point which immediately overlies the pupil of the eye when the patient looks straight ahead at an object at or near optical infinity. This can be referred to as the "visual center" for that respective eye lens.

It is to be noted that this point can be different than the "optical center" of a lens, the "optical center" being the point through the lens where there is no deflection.

Each of these visual centers for the left and right eye is separated by a distance. This can be referred to as the "inter-pupilary distance" or, more simply, "i.p.d."

Spectacles worn on the head most commonly fit in nose bridge type lens mounting frames. That is to say, each lens is contained in and typically surrounded by a circumscribing frame. The frame for each eye is interconnected across the nose by a bar or bridge. This bar or bridge typically spans and fits to the nose of the human face. Such spectacles are herein referred to as "nose bridge mounted spectacles."

As far as the wearer is concerned, nose bridge mounted spectacles must have the visual center for each eye lens precisely located with respect to the bridge of the nose.

Regarding the determination of the elevation of the visual center, lens meters have heretofore been provided with an adjustable bar. This bar elevates or lowers the bottom portion of the spectacle frames or lenses with respect to the measuring point. Thus, the elevation of the visual center for each of the lenses is readily determined.

This is not the case with the transverse dimension of the visual center. That is to say, the distance between the nose bridge and the transverse location of the visual center for each of the lenses for each eye has not been capable of precise location by such bars.

In the prior art, such elevational and transverse measurements of the visual center have been made by a marking of the lenses. Typically, this marking must be offset from the visual center, since the visual center is the point where optic measurements are typically made. Moreover, after the lens is marked and measured it must be cleaned, this cleaning causing further time and delay in accomplishing measurement of the suspect optics.

It should be appreciated that patients with known optical corrections (particularly strong optical corrections) frequently have to have their spectacles measured for their power in sphere, cylinder, axis and prism even before the process of checking and renewing a prescription commences. Thus, the time consuming sequence of such measurements including individual lens marking and individual registering of each lens for each eye and finally cleaning of the spectacles after measurement delays the entire process of patient prescription.

SUMMARY OF THE INVENTION

In combination with a lens meter for measuring along a single optical path the power of suspect optics, an apparatus for positioning nose bridge mounted spectacles is disclosed. At least one nose locator piece simulating the shape and location of the human nose is mounted for sliding movement on a bar. A bar locks vertical lens movement on the base of the lens frame at the bottom of the lenses to establish the elevation of the visual center on each lens for each eye. The transverse spacing of the nose locator piece locates the remaining coordinate of the visual center of the suspect lens. The nose locator piece, when registered to the spectacles at the nose bridge, is read through an attached and typically magnified scale to indicate nose bridge to visual center distance. By using paired nose locator pieces and paired scales, rapid measurement of nose frame mounted spectacles can occur at the spaced visual centers for the right and left eye lens to a lens meter having a monocular light path. The bar locking vertical lens movement preferably includes a pressure sensitive portion to indicate a positioned lens for measurement as well as to provide identification (left or right suspect lens) of the particular nose bridge mounted suspect lens being measured.

OBJECTS AND ADVANTAGES OF THE INVENTION

An object of this invention is to disclose an attachment which fits any lens meter having a single optical measurement path, which attachment rapidly locates nose bridge frame mounted suspect lenses to their visual center. Typically, a bar is mounted to elevate at least one spectacle lens to the elevation of the visual center of the suspect lens. At least one nose locator is mounted for sliding movement on this bar towards and away from the single optical path of the lens meter. Relative movement of the nose locator relative to the bar reads out at a scale. The scale is typically printed out on the bar and read at the nose locater. The scale can read either the desired inter-pupilary distance spacing or the nose bridge to lens visual center spacing. Rapid registration of each of the lenses to the desired spatial interval can occur.

An advantage of this invention is that the procedure of measuring and marking the lenses for subsequent registration to the visual center can be avoided. Once this is done, cleaning of the lenses after their measurement is no longer required.

A further advantage of this invention is that by using a nose locator piece, natural positioning of the spectacle frame to the emulated nose on the machine occurs. Thus, where the frames have become bent or deformed, the positioning device readily measures and indicates such deformation.

A further advantage of this invention is that the critical contour of the frame to the nose forms the base for the transverse positioning of the visual center for each of the left and right suspect lenses. For example, where the nose is not central of the eye (say, in the case of an athlete having a badly broken nose), location of the transverse spacing of the inter-pupilary point with the attachment to the lens meter is the same as location of that point on the forehead of the patient. The nose bridge, which is the critical parameter in affecting patient transverse suspect lens location, forms the critical parameter in affecting lens meter transverse suspect lens location.

Another object of this invention is to disclose an apparatus for locating the visual center of both lenses of nose bridge frame spectacles with rapidity to their respective positions between the nose bridge and the single optical path of a typical lens meter. According to this aspect of the invention, the locator bar has first and second nose locator pieces attached on opposite sides of the single optical path of the lens meter. One nose locator piece on the left side of the single optical path is for measurement of the visual center of the right eye lens; the other nose locator piece on the right side of the single optical path is for the measurement of the visual center of the left eye lens.

An advantage of this aspect of the invention is that both lenses can be conveniently and immediately measured. Moreover, where the spacings between the bridge of the nose and each of the visual centers of the suspect optics are different, each of the nose locator points can be rapidly moved to indicate such a difference.

A further object of this invention is to provide a pressure sensitive point on the bar to which the bottom of the spectacle frames are registered and pressed to indicate when a lens is ready and properly registered for measurement.

An advantage of this aspect of the invention is that the lens meter is given a remote signal when the spectacles are in a position for measurement.

A further advantage of this aspect of the invention is that by placing two pressure sensitive areas on the bar, a first remote indication can be given when the left eye lens is registered for measurement, and a second remote indication can be given when the right lens is registered for measurement. These respective remote indications can be used to identify in lens meter printouts the measurement of the lens for each eye, left or right, from the measurement of the lens for the remaining eye.

A further advantage of this invention is that the combination of the nose locator devices (giving rapid and accurate visual center registration) with the pressure sensitive switches (identifying the lens under measurement) allow an automatic lens meter to easily and accurately measure the prismatic effect of the nose bridge mounted spectacles.

Other objects, features and advantages of this invention will become apparent after referring to the following specification and attached drawings in which:

FIG. 1 is a perspective view of the apparatus for locating the inter-pupilary distance of nose bridge mounted lenses to a lens meter;

FIG. 2 is an enlarged portion of the bar and nose locator of this invention; and, FIG. 3 illustrates a special apparatus for permitting registry of the nose locator pieces while at the same time preventing interference of one nose locator piece with a suspect lens being measured when the other and remaining nose locator piece is being utilized for measurement.

Referring to FIG. 1, spectacles A shown in broken lines are mounted within a lens meter B having a sampling interval C in the optic path of the lens meter. A bar assembly D includes nose locator assemblies $E_1$ and $E_2$. As herein illustrated, right suspect lens 14 of spectacles A is held in position for measurement against bar D and registered to nose locator $E_1$.

In order to understand the function of this apparatus completely, the functional part of spectacles A will first be explained. Thereafter, the individual portions of the apparatus for locating the spectacles will be set forth. Finally, the function of the apparatus will be discussed.

Spectacles A consist of paired lens 14 for the right eye and 15 for the left eye. These lenses are mounted to a nose bridge frame 16. Each lens includes a circumscribing frame 18 for lens 14, and 19 for lens 15. Conventional ear bars are shown descending from the nose bridge frame 16. As is conventional, the glasses include a bridge 20 between the respective circumscribing frames. As is conventional on either side of bridge 20 at the respective circumscribing frames, the frame is modified to fit to the human nose. It should be appreciated that any manner and sort of frames and/or lenses which are made to sit or rest, fit or conform to in any manner, contour of the human nose can be used with this invention.

Lens meter B comprises a lens meter having a single optic path with a lens measuring interval C. Since most lens meters, for reasons of economy, are monocular or have a single optical path, provision naturally has to be made to measure both spectacle lenses 14, 15. This will hereinafter be set forth.

It should be clearly understood that this invention is not limited to any particular kind of lens meter being used. For example, this invention can be used with a lens meter such as that described in the Tillyer et al. U.S. Pat. No. 1,383,678, issued July 5, 1921.

Further, it should be understood that the particular area of the lens which is sampled by the lens meter does not really make any difference with respect to the locator portions of this invention. For example, most lens meters sample a small, hopefully representative segment of a uniform lens. Some lens meters sample large portions of a lens. All that is required is that the sampling area be properly registered with respect to the visual center of the lens.

It should be noted that the particular lens meter here shown includes a bar D. Bar D is moveable into and out of lens meter B. With respect to spectacles A, this movement alters the height of the sampling area above the bottom of the frame of the spectacles A. Such movement locates the vertical component of the visual center of the lenses being measured — here, the vertical component of the visual center of lens 14.

It should be appreciated that this much is known in the prior art. That is to say, prior art lens meters have included a bar such as bar D which moves up and down. It is the particular apparatus for affecting transverse registry of the visual center which forms the novel part of this disclosure.

Referring to FIG. 2, bar D is shown having a nose locator piece $E_1$ shown thereon. Nose locator piece $E_1$ includes a first member 30 having paired wings 31, 32 with a nose bridge ridge 33 there between. As can plainly be seen, wings 31, 32 in combination with ridge 33 emulate the general contour of the bridge of a human nose for conforming fit to the spectacles A. This appliance is mounted for sliding movement at a car 35, which car grips bar D peripherally and slides along the direction of the bar. Underlying the upper portion of bar D there is a scale 36. Scale 36 is calibrated in distance intervals from measuring the distance between interval C of the lens meter and ridge 33 (the remainder of the lens meter being omitted in FIG. 2). It should be noted that the portion of the car 35 gripping bar D extends outwardly and beyond car 35 at a portion 37. This portion 37 is given a length in case two nose piece assemblies are used (see FIG. 3); portion 37 pushes any other nose locator out of interference with measurement of an opposite lens in spectacles A.

Protruding downwardly from car 35 are two angularly inclined tabs 40, 41. Tabs 40, 41 provide a hinge point 42 for nose bridge piece 30. Nose bridge piece 30 is in turn biased outwardly against a limiting mechanism (not shown) by a compressed coil spring 44.

It should be appreciated that car 35 can be made to slide on bar D in any manner. As here shown, car 35 grips the periphery of the bar and merely slides along its top. To expedite the reading of the scale 36, a scale magnifier 46 is placed over an aperture in the car 35. The scale intervals can be read at a magnifier cursor 48.

As has been previously set forth, it is useful to provide bar D with pressure sensitive portions 50, 51; these pressure sensitive portions being shown at the lefthand and righthand portions of the bar.

Referring to the righthand portion of bar D, second pressure sensitive portion 51 is shown. This pressure sensitive portion is broken away at 52 to expose an underlying pressure sensitive switch 53. When pressure is applied at bar 51, the underlying pressure sensitive switch 53 is closed. The switch across contacts 54, 55 indicates a closed circuit. This closed circuit can be communicated by wiring (not shown) to the internal portion of any particular lens meter used with this invention. At least two useful discrete indications can result therefrom.

First, the pressure switch can be utilized to indicate the positioning of spectacles A for reading. Referring to the view in FIG. 1, it will be seen that the bottom of the circumscribing frame 19, when pressed against switch 50, will indicate that lens 14 has been placed to the lens meter for reading. Likewise, it can be seen if nose locator piece $E_2$ is used, the bottom portion of circumscribing frame 18 will press against the bar at pressure sensitive portion 51. This will indicate that lens 15 is in position for reading.

Secondly, and assuming lens meter B has a provision for automated printout, the pressure sensitive portions 50, 51 can be used to identify the particular lens being measured. For example, where right lens 14 is being measured, depression of pressure sensitive portion 50 will indicate measurement of the right lens. Where left lens 15 is being measured, depression of the pressure sensitive portion 51 will indicate that left lens 15 is being measured. Thus, any printout associated with that particular kind of lens meter being used can automatically distinguish the particular lens, left or right, being measured, with the invention of this apparatus.

It should also be apparent to the reader that by using the nose locator pieces $E_1$, $E_2$, that unsymmetrical spacing of a nose on a person's face can be readily accommodated in the lens meter. For example, referring to the case of the athlete with a badly broken nose, the individual and separate motion of the nose locators $E_1$, $E_2$ can unevenly divide the desired interpupilary distance with rapidity.

Referring to FIG. 3, an alternate embodiment of this invention is illustrated. Cars 35 and 35' are adapted respectively to about blocks 60, 61. Blocks 60, 61 ride on rod 64 between paired journals 65, 66. Rod 64 is turned by a knob 67. Bar 64 is provided with oppositely running lefthand and righthand threads 70, 71. Each of the cars 35, 35' can move away from the respective blocks 60, 61. Inward movement, however, is limited. The respective cars 35, 35', in moving towards the measuring interval C of the lens meter (not shown), are blocked in their inward travel by block 60, 61.

This blocking of the inward travel readily registers nose locator $E_1$ with respect to nose locator $E_2$ so that symmetrical spacing of inter-pupilary distance from nose bridge frame mounted spectacle lenses can be readily measured. In the case where there is a symmetry, small motion of knob 67 for the second measurement can occur.

It should likewise be apparent that various accommodations for movement between cars 35, 35' can be made. For example, wire linkages and the like to affect simultaneous movement of the cars could just as well be made. Further, provision for other than visual reading of the scales could be added. For example, car movement could be read by resistors of the linear variety connected to the car.

Blocks 60, 61 and rod 64 between paired journals 65, 66 are here shown in front of bar D. It should be appreciated that placement behind bar D may be preferred for improved access to the lens sampling interval and any pressure switches. The embodiment here shown is for purposes of clarity.

It should be appreciated that modifications can be made to this invention without departing from the spirit thereof.

What is claimed is:

1. In the combination of a lens meter having a single path for sampling at least a segment of a suspect lens placed within said lens meter, a sampling interval in said optical path provided for the placement of said suspect lens, and means for registering a suspect lens for measurement in said lens meter, the improvement in said means for registering comprising: a bar extending transversely of said single path on at least one side of said sampling interval to extend substantially parallel to a pair of nose bridge frame mounted suspect lenses along a line spanning at least a portion of the distance between the right lens on one side of said nose bridge frame to the left lens on the other side of said nose bridge frame; means for a conforming fit to the nose receiving interval in said nose bridge frame mounted suspect lenses to substantially locate the position of the nose bridge of frame of said glasses with respect to said bar; means for mounting said nose conforming fit means to said bar for towards and away movement from said sampling interval to register one of said suspect lenses to said sampling interval; and, means for indicating the distance interval for measuring the separation between said nose conforming fit means and the visual center of a suspect lens being measured by said lens meter.

2. The invention of claim 1 and wherein said bar is rigidly mounted to said lens meter and said mounting means for said nose conforming fit means includes means for sliding movement of said nose conforming fit means along said bar.

3. The invention of claim 1 and wherein said means for indicating includes a scale on said bar and said nose conforming fit means includes a cursor for indicating said distance interval.

4. In combination a lens meter having a single path for sampling at least a segment of a suspect lens placed within said lens meter; a sampling interval in said optical path provided for the placement of a suspect lens mounted to a pair of nose bridge frame mounted suspect spectacle lenses; a bar extending transversely of said single path on at least one side of said sampling interval to extend substantially parallel to a pair of nose bridge frame mounted suspect lenses along a line spanning at least a portion of the distance between the right lens on one side of said nose bridge from to the left lens on the other side of nose bridge frame; means for a conforming fit to the nose receiving interval in said nose bridge frame mounted suspect lenses to substantially locate the position of the nose bridge frame of said glasses with respect to said bar; means for mounting said nose conforming fit means to said bar for towards and away movement from said sampling interval to register one of said suspect lenses to said sampling interval; and means for indicating the distance interval for measuring the separation between said nose conforming fit means and the visual center of said suspect lens being measured by said lens means.

5. The invention of claim 4 and wherein the means for indicating the distance interval measures the distance between the sampling interval of said lens meter and the means for a conforming fit to the nose receiving interval.

6. The invention of claim 4 and wherein said bar extends on either side of said sampling interval.

7. The invention of claim 4 and including first and second means for a conforming fit to the nose receiving interval in said nose bridge frame mounted suspect lenses, said first means mounted on one side sampling interval and said second means mounted on the other side of sampling interval.

8. Apparatus for spacing nose bridge frame mounted suspect lenses to a lens meter having a single path for sampling at least a segment of a suspect lens placed within said lens meter at a sampling interval in said optic path, said apparatus comprising a bar extending transversely of said single path on at least one side of said sampling interval to extend substantially parallel to said pair of nose bridge frame mounted suspect lenses along a line spanning at least a portion of the length between the right lens on one side of said nose bridge frame to the left lens on the other side of said nose bridge frame; means for a conforming fit to the nose receiving interval in said nose bridge frame mounted suspect lenses to substantially locate the position of the nose bridge frame of said glasses with respect to said bar; means for mounting said nose conforming fit means to said bar for towards and away movement from said sampling intervals to register one of said suspect lenses to said sampling interval; means for indicating the distance interval for measuring the separation between said nose conforming fit means in the visual center of a suspect lens being measured by said lens meter; and pressure sensitive switch means mounted to said bar for indicating a positioned suspect lens for measurement by said lens meter.

9. The invention of claim 8 and wherein said pressure sensitive switch is positioned to be actuated by one of the suspect lenses of said nose bridge mounted spectacle lenses when the other of said nose bridge mounted spectacle lenses is positioned for measurement at said sampling interval.

10. The invention of claim 8 and including first and second means for a conforming fit to the nose receiving interval in said nose bridge frame mounted suspect lenses; one of said conforming fit means mounted for towards and away movement on said bar on one side of sampling interval and the other of said conforming fit means mounted for movement towards and away from said sampling interval on said bar on the other side of said sampling interval.

11. In the combination of a lens meter having a single path for sampling at least a segment of a suspect lens placed within said lens meter, a sampling interval in said optical path provided for the placement of said suspect lens, and means for registering a suspect lens for measurement in said lens meter, the improvement in said means for registering comprising: a bar extending transversely of said single path on at least one side of said sampling interval to extend substantially parallel to a pair of nose bridge frame mounted suspect lenses along a line spanning at least a portion of the distance between the right lens on one side of said nose bridge frame to the left lens on the other side of said nose bridge frame; first and second means for a conforming fit to the nose receiving interval in said nose bridge frame mounted suspect lenses to substantially locate the position of the nose bridge frame of said glasses with respect to said bar; said first means for a conforming fit for registering left suspect lens to said sampling interval and said second means for a conforming fit for registering right suspect lens to said sampling interval; means for mounting said nose conforming fit means to said bar for towards and away movement from said sampling interval to register one of said suspect lenses to said sampling interval; and, means for indicating the distance interval for measuring the separation between said nose conforming fit means and the visual center of a suspect lens being measured by said lens meter.

12. The combination of claim 11 and wherein one of said means for a conforming fit when registered to nose bridge frame mounted spectacles is operatively connected to said other means for a conforming fit to cause said other means for a conforming fit to move away from and clear of said sampling interval.

13. The combination of claim 11 and including means for providing first and second stops for said first and second means for a conforming fit to permit said respective right and left lenses to be registered to said sampling interval at predetermined interpupillary distance.

* * * * *